(12) United States Patent
Ito

(10) Patent No.: US 7,710,517 B2
(45) Date of Patent: May 4, 2010

(54) LIQUID CRYSTAL DISPLAY

(75) Inventor: Hideaki Ito, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 268 days.

(21) Appl. No.: 11/817,249

(22) PCT Filed: Feb. 28, 2006

(86) PCT No.: PCT/JP2006/304217

§ 371 (c)(1),
(2), (4) Date: Aug. 28, 2007

(87) PCT Pub. No.: WO2006/090929

PCT Pub. Date: Aug. 31, 2006

(65) Prior Publication Data

US 2009/0009695 A1    Jan. 8, 2009

(30) Foreign Application Priority Data

Feb. 28, 2005    (JP)    ............... 2005-054160

(51) Int. Cl.
*G02F 1/1335*    (2006.01)
(52) U.S. Cl. .......................... 349/96; 349/106
(58) Field of Classification Search ............ 349/96, 349/106
See application file for complete search history.

(56) References Cited

U.S. PATENT DOCUMENTS

2003/0003378 A1    1/2003    Yamashita et al.
2004/0076770 A1    4/2004    Yamashita
2006/0098316 A1*   5/2006    Tatsuzawa et al. .......... 359/891
2006/0274233 A1*   12/2006   Takizawa .................... 349/108

FOREIGN PATENT DOCUMENTS

| JP | 2001-228322 A | 8/2001 |
| JP | 2002-107525 A | 4/2002 |
| JP | 2002-328215 A | 11/2002 |
| JP | 2002-365427 A | 12/2002 |
| JP | 2004-78102 A | 3/2004 |
| JP | 2004-309537 A | 11/2004 |
| JP | 2004-347831 A | 12/2004 |

OTHER PUBLICATIONS

EP Communication, dated Feb. 11, 2010, issued in corresponding EP Application No. 06715260.3, 6 pages.

* cited by examiner

*Primary Examiner*—Ellen Kim
(74) *Attorney, Agent, or Firm*—Sughrue Mion, PLLC

(57) ABSTRACT

A liquid crystal display includes a backlight, a polarization plate, at least two substrates, a liquid crystal layer placed between the substrates, and a color filter layer formed on at least a part of the substrates, wherein the color filter layer has green pixels that satisfy the relations $0.25<x<0.32$ and $y>0.58$, wherein x and y each represent a chromaticity value in an xy color system using illuminant C, the color filter layer has a contrast of 1000 or more with respect to each of X, Y and Z values, and the backlight uses a light-emitting device having a peak wavelength in the range of from 520 to 540 nm as a light source.

17 Claims, No Drawings

LIQUID CRYSTAL DISPLAY

TECHNICAL FIELD

The present invention relates to a liquid crystal display having improved display color vividness.

BACKGROUND ART

Liquid crystal displays, which were first introduced into small-sized apparatuses such as pocket calculators or the like, have found widespread applications such as mobile apparatuses, personal computers, monitors, and television sets. With the widespread use, full-color liquid crystal displays have been produced, and bright display color have been demanded.

Thus, color reproduction range has been extended by increasing the content of pigments or the like in color filters, and the associated reduction in vividness has been compensated by improving backlights and optical components.

In addition, techniques for optimizing the wavelengths of backlights have been employed. Japanese Patent Application Laid-Open (JP-A) No. 2004-78102 discloses an example of such techniques in which an LED is used as a light source to extend color reproduction range (by shifting the wavelength of a green emission peak to a shorter wavelength).

As mentioned above, improvements in vividness have been investigated based on the extension of the color reproduction range of color filters and the optimization of the wavelengths of backlights.

In recent years, however, as display screens are upsized, higher display quality has been required. In particular, the vividness of display colors is a factor that significantly affects the quality of displayed images and thus should be improved.

DISCLOSURE OF INVENTION

The present invention has been made in view of the above circumstances and provide a liquid crystal display, including a backlight, a polarization plate, at least two substrates, a liquid crystal layer placed between the substrates, and a color filter layer formed on at least a part of the substrates, wherein the color filter layer has green pixels that satisfy the relations $0.25<x<0.32$ and $y>0.58$, wherein x and y each represent a chromaticity value in an xy color system using illuminant C, the color filter layer has a contrast of 1000 or more with respect to each of X, Y and Z values, and the backlight uses a light-emitting device having a peak wavelength in the range of from 520 to 540 nm as a light source.

BEST MODE FOR CARRYING OUT THE INVENTION

According to the present invention, there can be provided liquid crystal displays with improved display color vividness.

The inventors focuses attention on an increase in black density, which has been used to improve vividness in techniques of recognizing images by reflection of external light, such as silver salt photography. In such reflection techniques, the vividness of images cannot be higher than that of external light. Thus, such techniques are based on the fact that images appear to be vivider when the black part of the background for images becomes denser. However, such an effect of an increase in black density has been unclear in liquid crystal displays, because they are of self-emission type having an internal light source and thus provide sufficiently high image vividness.

From actual tests, it is found that an increase in black density leads to an improvement in vividness even in liquid crystal displays and that as the screen size is increased, the effect can be increased.

When black is displayed, color filters with low contrasts can cause light leakage and produce slightly lighter black. In such a situation, it is found that the actual viewer cannot recognize an improvement in vividness when only a backlight is simply improved so as to have an extended color reproduction range. Thus, the inventors conclude that both an extension of color reproduction range and an increase in the contrast of a color filter should be essential for satisfactory vividness, when completing the invention.

Thus, the invention is made with the means as describe below.

The liquid crystal display of the invention includes a backlight, a polarization plate, at least two substrates, a liquid crystal layer placed between the substrates, and a color filter layer formed on at least a part of the substrates, wherein the color filter layer has green pixels that satisfy the relations $0.25<x<0.32$ and $y>0.58$, wherein x and y each represent a chromaticity value in an xy color system using illuminant C, the color filter layer has a contrast of 1000 or more with respect to each of X, Y and Z values, and the backlight uses a light-emitting device having a peak wavelength in the range of from 520 to 540 nm as a light source. Herein the "xy color system" refers to a xy chromaticity diagram based on the CIE 1931 XYZ color system. The "illuminant C" is a CIE standard illuminant.

This structure can provide liquid crystal displays with improved vividness of display colors.

Liquid Crystal Display

The liquid crystal display of the invention includes a backlight, a polarization plate, at least two substrates, a liquid crystal layer placed between the substrates, and a color filter layer formed on at least a part of the substrates.

The liquid crystal display of the invention will be described in detail below.

A typical structure of the liquid crystal display of the invention includes: a first substrate including a transparent substrate, an active element such as a TFT element, a pixel electrode, and an oriented film, which are formed on the transparent substrate; a second substrate including a color filter, a counter electrode and an oriented film; and a liquid crystal that is packed between the first and second substrates such that the oriented films are opposed to each other and enclosed with a sealing agent. Spacers are used to keep the distance between the substrates constant. A polarization plate is placed on both outer sides of the substrates. A backlight is placed on the first substrate side. It will be understood that the structure of the liquid crystal display of the invention is not limited to the above.

Backlight

According to the invention, the backlight uses a light-emitting device having a peak wavelength in the range of from 520 to 540 nm.

More specifically, a light-emitting diode (LED) is preferably used as the light-emitting device. A backlight using such a light-emitting diode is described in detail on paragraphs [0017] to [0036] of JP-A No. 2004-78102, which incorporated herein by reference in its entirety.

A backlight includes a red (R) LED, a green (G) LED and a blue (B) LED. Specifically, the backlight that includes the red (R) LED with a peak wavelength of 610 nm or more, the green (G) LED with a peak wavelength of 530±10 nm, and the blue (B) LED with a peak wavelength of 480 nm or less is preferably used. In particular, if the green (G) LED has a peak wavelength in the range of from 520 to 540 nm, the liquid crystal display of the invention can have a wide color reproduction range with respect to green. According to the invention, the green (G) LED should have a peak wavelength in the range of from 520 to 540 nm, preferably from 525 to 535 nm. This allows a higher NTSC ratio for color reproduction range than is possible with a conventional cold-cathode tube.

Examples of the green (G) LED having the peak wavelength in the above range include DG1112H (manufactured by STANLEY ELECTRIC CO., LTD.), UG1112H (manufactured by STANLEY ELECTRIC CO., LTD.), E1L51-3G (manufactured by TOYODA GOSEI CO., LTD.), E1L49-3G (manufactured by TOYODA GOSEI CO., LTD.), and NSPG500S (manufactured by Nichia Corporation).

Any red (R) LED may be preferably used as a light source of the backlight according to the invention. In this case, the peak wavelength of the red (R) LED is preferably, but not limited to, 610 nm or more, more preferably in the range of from 615 to 640 nm. This allows the reproduction of the red chromaticity point according to the NTSC standard in the liquid crystal display of the invention.

Examples of the red (R) LED include FR1112H (manufactured by STANLEY ELECTRIC CO., LTD.), FR5366X (manufactured by STANLEY ELECTRIC CO., LTD.), NSTM515AS(R) (manufactured by Nichia Corporation), GL3ZR2D1COS (manufactured by SHARP CORPORATION), and GM1JJ35200AE (manufactured by SHARP CORPORATION).

A blue (B) LED may be preferably used as a light source of the backlight according to the invention. In this case, any LED with a peak wavelength of 480 nm or less may be used. The peak wavelength of the blue (B) LED is preferably 480 nm or less, more preferably in the range of from 465 to 475 nm. This allows the reproduction of the blue chromaticity point according to the NTSC standard in the liquid crystal display of the invention.

Examples of the blue (B) LED include DB1112H (manufactured by STANLEY ELECTRIC CO., LTD.), DB5306X (manufactured by STANLEY ELECTRIC CO., LTD.), E1L51-3B (manufactured by TOYODA GOSEI CO., LTD.), E1L4E-SB1A (manufactured by TOYODA GOSEI CO., LTD.), NSPB630S (manufactured by Nichia Corporation), and NSPB310A (manufactured by Nichia Corporation).

The peak wavelength according to the invention may be determined from spectroscopic measurements obtained with a spectrophotometer (trade name: MCPD-2000, manufactured by Otsuka Electronics Co., Ltd.).

Color Filter Layer

According to the invention, the color filter layer is formed on at least a part of the at least two substrates and includes a plurality of red (R) pixels, a plurality of green (G) pixels and a plurality of blue (B) pixels.

In the color filter layer, the green (G) pixels satisfy the relations $0.25<x<0.32$ and $y>0.58$, preferably satisfy the relations $0.26<x<0.31$ and $y>0.59$, most preferably satisfy the relations $0.27<x<0.30$ and $y>0.595$, wherein x and y each represent a chromaticity value in an xy color system using illuminant C. These chromaticity values are adjusted by the type and amount of the colorant(s) contained therein as described later.

According to the invention, the color filter layer also has a contrast of 1000 or more with respect to each of X, Y and Z values, preferably of 1200 or more, more preferably of 1500 or more, still more preferably of 2000 or more, most preferably of 3000 or more, with respect to each of X, Y and Z values.

Herein, the "contrast" of X, Y and Z values of the invention is defined as the ratio the amount of light passing through a laminate comprising two polarization plates in a parallel configuration and the color filter placed between the polarization plates and the amount of light passing through a laminate comprising two polarization plates in a crossed-Nicols configuration and the color filter placed between the polarization plates. Thus, in the case of the contrast of the X value, the X value is calculated by integration of the transmission spectrum of light passing through a laminate and the color matching function ($\bar{x}(\lambda)$). Then, the contrast of X value is defined as the ratio of the X value at two polarization plates in a parallel configuration to the X value at two polarization plates in a crossed-Nicols configuration.

The high contrast of the color filter layer is achieved by increasing the dispersibility of the colorant(s) for use and reducing the particle size of the colorant(s), which will be described in detail later.

In the color filter layer, the red (R) pixels preferably satisfy the relations $0.60<x$ and $0.30<y<0.36$, more preferably satisfy the relations $0.62<x$ and $0.31<y<0.35$, most preferably satisfy the relations $0.63<x$ and $0.32<y<0.34$, wherein x and y each represent a chromaticity value in the xy color system using illuminant C.

These chromaticity values are adjusted by the type and amount of the colorant(s) contained therein as described later.

In the color filter layer according to the invention, the blue (B) pixels preferably satisfy the relations $0.12<x<0.15$ and $0.08<y<0.11$, more preferably satisfy the relations $0.12<x<0.14$ and $0.09<y<0.11$, most preferably satisfy the relations $0.13<x<0.14$ and $0.09<y<0.11$, wherein x and y each represent a chromaticity value in the xy color system using illuminant C.

These chromaticity values are adjusted by the type and amount of the colorant(s) contained therein as described later.

According to the invention, a combination of the backlight and the color filter layer with chromaticity values set within the above range can provide a wide color reproduction range corresponding to NTSC.

The color filter with contrast values set within the above range according to the invention allows display of denser black and contributes to the improved vividness of the liquid crystal display of the invention.

Polarization Plate

In the invention, the polarization degree of the polarization plate is preferably, but not limited to, 99.9 or more, more preferably 99.95 or more, most preferably 99.99 or more. At a polarization degree of 99.9 or more, the polarization plate can be prevented from causing light leakage, and black can preferably be displayed at an increased density.

The polarization degree is defined as follows:

$$\text{Polarization degree} = (((Tp-Tc)/(Tp+Tc))^{0.5}) \times 100$$

wherein Tp is transmittance through a combination of parallel polarization plates, and Tc is transmittance through a combination of polarization plates at a right angle.

In the invention, for example, the polarization plate is produced by dyeing or adsorbing iodine or a certain dye on polyvinyl alcohol and stretching or orienting the polyvinyl alcohol, so that the resulting polarization plate has the function of transmitting polarized light only in a certain oscillation direction.

Examples of the polarization plate include iodine types manufactured by Sanritz Corporation, such as HLC2-5618 (polarization degree: 99.979), HLC2-2518 (polarization degree: 99.991), UHLC2-5618 (polarization degree: 99.975), LLC2-9118 (polarization degree: 99.982), LLC2-9218 (polarization degree: 99.974), LLC2-81-18 (polarization degree: 99.985), and dye types manufactured by Sanritz Corporation, such as HC2-6018 (polarization degree: 99.952).

In terms of keeping a certain contrast for long term, the iodine types are particularly preferred. In terms of color balance, gray-colored polarization plates are more preferred, such as HLC2-5618 (gray), HLC2-2518 (gray), UHLC2-5618 (gray), LLC2-9118 (gray), LLC2-9218 (gray), and LLC2-81-18 (gray) each manufactured by Sanritz Corporation. In terms of reducing black color balance shift caused by high contrast, polarization plates that provide a cross transmittance of 0.02% or less at 400 nm (such as HLC2-2518 (0.01%) manufactured by Sanritz Corporation) are most preferred.

Substrate

In the invention, at least two substrates are necessary, which are preferably transparent substrates. Examples of transparent substrates include known glass plates such as a soda glass plate having a surface silicon oxide film, a low expansion glass, an alkali-free glass, and a quartz glass plate; and plastic films.

The substrate may be preliminarily subjected to coupling treatment or the like so as to have good adhesion to a colored photosensitive resin composition or a resin transfer material. The coupling treatment is preferably performed using the method described in JP-A No. 2000-39033. In general, the thickness of the substrate is preferably, but not limited to, from 200 to 1200 μm.

Liquid Crystal Layer

In the invention, the liquid crystal layer may employ various liquid crystal modes such as ECB (Electrically Controlled Birefringence), TN (Twisted Nematic), IPS (In-Plane Switching), FLC (Ferroelectric Liquid Crystal), OCB (Optically Compensatory Bend), STN (Super Twisted Nematic), VA (Vertically Aligned), HAN (Hybrid Aligned Nematic), GH (Guest Host), PVA (Patterned Vertically Alignment), and MVA (Multi-domain Vertical Alignment) modes. In particular, the liquid crystal layer preferably employs the TN, MVA, IPS, PVA, or OCB mode. The MVA, IPS (super IPS), PVA, or OCB mode is more preferably used because of its high moving image display performance and low viewing-angle dependency. A high-black-contrast PVA mode, an MVA mode with preventive measures for light leakage around alignment control projections, and a high contrast IPS (super IPS) mode are most preferably used.

Electrodes

In the invention, the electrodes refer to electrodes through which an electric field is applied to the liquid crystal molecule in the liquid crystal layer. In such a liquid crystal mode as a TN, MVA, PVA, or OCB mode, the electrodes are formed on the liquid crystal sides of two substrates. In an IPS mode, the electrodes are formed on at least one of two substrates between which a liquid crystal is sandwiched. Indium oxide (ITO) or the like is used as a material for the electrodes.

Screen Size

The advantageous effect of the invention would be more significant as the screen size of the liquid crystal display becomes large. Thus, the liquid crystal display of the invention preferably has a screen size of 10 inches or more, more preferably of 15 inches or more, most preferably of 20 inches or more. Herein, the screen size of the liquid crystal display of the invention refers to the length of the diagonal of an effective display area.

Colored Photosensitive Resin Composition

In the invention, the color filter layer may be formed by any method that can produce the above properties of the color filter layer. In particular, a colored photosensitive resin composition is preferably used to form the color filter layer.

The colored photosensitive resin composition includes at least (1) an alkali-soluble resin, (2) a monomer or an oligomer, (3) a photopolymerization initiator or a photopolymerization initiator system, and (4) a colorant.

(1) Alkali-Soluble Binder

The alkali-soluble binder (hereinafter, simply referred to as "binder" in some cases) used in the invention is preferably a polymer having a polar group such as a carboxylic acid group or a carboxylate group on a side chain thereof. Examples thereof include a methacrylic acid copolymer, an acrylic acid copolymer, an itaconic acid copolymer, a crotonic acid copolymer, a maleic acid copolymer, and a partially-esterified maleic acid copolymer. Such copolymers are disclosed, for example, in JP-A No. 59-44615, Japanese Patent Publication (JP-B) No. 54-34327, JP-B No. 58-12577, JP-B No. 54-25957, JP-A No. 59-53836 and JP-A No. 59-71048, the disclosures of which are incorporated herein by reference. Examples of the alkali-soluble binder further include a cellulose derivative having a carboxylic acid group on a side chain thereof and a polymer obtained by adding a cyclic acid anhydride to a polymer having a hydroxyl group. Particularly preferable examples include a copolymer of benzyl (meth) acrylate and (meth)acrylic acid, and a multi-component copolymer of benzyl (meth)acrylate, (meth)acrylic acid and other monomers, such as the copolymers described in U.S. Pat. No. 4,139,391, the disclosure of which is incorporated herein by reference. These binder polymers having polar groups each may be used alone or may be contained in a composition which also contains a usual film-forming polymer. The proportion of the colored photosensitive resin composition to the total solid content is generally 20 to 50% by mass, preferably 25 to 45% by mass.

(2) Monomer or Oligomer

The monomer or oligomer used in the invention is preferably a monomer or oligomer which has two or more ethylenic unsaturated double bonds and which is addition-polymerized by irradiation with light. The monomer or oligomer may be a compound having at least one addition-polymerizable ethylenic unsaturated group therein and having a boiling point of 100° C. or higher at a normal pressure. Examples thereof include: a monofunctional acrylate and a monofunctional methacrylate such as polyethylene glycol mono(meth)acrylate, polypropylene glycol mono(meth)acrylate and phenoxyethyl(meth)acrylate; polyethylene glycol di(meth)acrylate, polypropylene glycol di(meth)acrylate, trimethylolethane triacrylate, trimethylolpropane tri(meth) acrylate, trimethylolpropane diacrylate, neopentyl glycol di(meth)acrylate, pentaerythritol tetra(meth)acrylate, pentaerythritol tri(meth)acrylate, dipentaerythritol hexa(meth) acrylate, dipentaerythritol penta(meth)acrylate, hexanediol di(meth)acrylate, trimethylolpropane tri(acryloyloxypropyl) ether, tri(acryloyloxyethyl)isocyanurate, tri(acryloyloxyethyl)cyanurate, glycerin tri(meth)acrylate; a polyfunctional acrylate or polyfunctional methacrylate which may be obtained by adding ethylene oxide or propylene oxide to a polyfunctional alcohol such as polymethylolpropane or glycerin and converting the adduct into a (meth)acrylate.

Examples of the monomer and oligomer further include an urethane acrylate such as urethane acrylates described in JP-B No. 48-41708, JP-B No. 50-6034 and JP-A No. 51-37193 (the disclosures of which are incorporated herein by reference), and a polyester acrylate such as polyester acrylates described in JP-A48-64183, JP-B 49-43191, and JP-B 52-30490 (the disclosures of which are incorporated herein by reference); a polyfunctional acrylate or polyfunctional methacrylate such as an epoxy acrylate which is a product of reaction of an epoxy resin and (meth)acrylic acid.

Among them, trimethylolpropane tri(meth)acrylate, pentaerythritol tetra(meth)acrylate, dipentaerythritol hexa(meth)acrylate, and dipentaerythritol penta(meth)acrylate are preferable.

Additionally, "polymerizable compound B" described in JP-A No. 11-133600 (the disclosure of which is incorporated herein by reference) is also preferable.

These monomers and oligomers each may be used alone. Alternatively, a mixture of two or more selected from these monomers and oligomers may be used. The proportion of the colored photosensitive resin composition to the total solid content is generally 5 to 50% by mass, preferably 10 to 40% by mass.

(3) Photopolymerization Initiator or Photopolymerization Initiator System

Examples of a photopolymerization initiator or a photopolymerization initiator system in the invention include a vicinal polyketaldonyl compound such as vicinal polyketaldonyl compounds disclosed in U.S. Pat. No. 2,367,660 (the disclosure of which is incorporated herein by reference), an acyloin ether compound such as acyloin ether compounds described in U.S. Pat. No. 2,448,828 (the disclosure of which is incorporated herein by reference), an aromatic acyloin compound substituted by an α-hydrocarbon such as described in U.S. Pat. No. 2,722,512 (the disclosure of which is incorporated herein by reference), a polynuclear quinine compound such as described in U.S. Pat. Nos. 3,046,127 and 2,951,758 (the disclosures of which are incorporated herein by reference), a combination of triarylimidazole dimer and p-ketone such as described in U.S. Pat. No. 3,549,367 (the disclosure of which is incorporated herein by reference), a benzothiazole compound and a trihalomethyl-s-triazine compound such as described in JP-B No. 51-48516 (the disclosure of which is incorporated herein by reference), a trihalomethyl-triazine compound such as described in U.S. Pat. No. 4,239,850 (the disclosure of which is incorporated herein by reference), and a trihalomethyloxadiazole compound such as described in U.S. Pat. No. 4,212,976 (the disclosure of which is incorporated herein by reference). In particular, trihalomethyl-s-triazine, trihalomethyloxadiazole and triarylimidazole dimer are preferable.

Additionally, "polymerization initiator C" described in JP-A No. 11-133600 (the disclosure of which is incorporated herein by reference) is also preferable.

These photopolymerization initiators and photopolymerization initiator system each may be used alone. Alternatively, a mixture of two or more selected from these photopolymerizable initiators and photopolymerization initiator systems may be used. It is preferable to use two or more selected from photopolymerizable initiators and photopolymerization initiator systems. When two or more selected from photopolymerizable initiators and photopolymerization initiator systems are used, the display property, particularly evenness of display, can be improved.

The proportion of the photopolymerization initiator and photopolymerization initiator system to the total solid content of the colored photosensitive resin composition is generally 0.5 to 20% by mass, preferably 1 to 15% by mass.

(4) Colorant

In the invention, the colorant is preferably (i) C. I. Pigment Red 254 for an R (red) colored photosensitive resin composition, (ii) C. I. Pigment Green 36 for a G (green) colored photosensitive resin composition or (iii) C. I. Pigment Blue 15:6 for a B (blue) colored photosensitive resin composition.

In a dry film produced from a 1.0 to 3.0 µm thick coating of the colored photosensitive resin composition, the content of (i) the red colorant (such as C. I. Pigment Red 254) is preferably from 0.80 to 0.96 g/m$^2$, more preferably from 0.82 to 0.94 g/m$^2$, particularly preferably from 0.84 to 0.92 g/m$^2$.

In a dry film produced from a 1.0 to 3.0 µm thick coating of the colored photosensitive resin composition, the content of (ii) the green colorant (such as C. I. Pigment Green 36) is preferably from 0.90 to 1.34 g/m$^2$, more preferably from 0.95 to 1.29 g/m$^2$, particularly preferably from 1.01 to 1.23 g/m$^2$.

In a dry film produced from a 1.0 to 3.0 µm thick coating of the colored photosensitive resin composition, the content of (iii) the blue colorant (such as C. I. Pigment Blue 15:6) is preferably from 0.59 to 0.67 g/m$^2$, more preferably from 0.60 to 0.66 g/m$^2$, particularly preferably from 0.61 to 0.65 g/m$^2$.

The above pigments may be used in combination with any other pigments. Examples of such pigments include the auxiliary dyes or pigments with color index (C. I.) numbers as listed below.

-Auxiliary Dyes or Pigments-

If necessary, any known colorant (dye or pigment) may be added to the above colorant (pigment) in the colored photosensitive resin composition according to the invention. When any known pigment is used as the colorant, it is preferred that the pigment be uniformly dispersed in the colored photosensitive resin composition, and thus the pigment should preferably have a particle size of 0.1 µm or less, particularly preferably of 0.08 µm or less.

When a combination of colorants is used, the total content of the above colorant and the known colorant(s) is preferably in the same range as described above for the colorant.

Examples of the known dyes or pigments include Victoria Pure Blue BO (C. I. 42595), auramine (C. I. 41000), Fat Black HB (C. I. 26150), C. I. Pigment Yellow 1, C. I. Pigment Yellow 3, C. I. Pigment Yellow 12, C. I. Pigment Yellow 13, C. I. Pigment Yellow 14, C. I. Pigment Yellow 5, C. I. Pigment Yellow 16, C. I. Pigment Yellow 17, C. I. Pigment Yellow 20, C. I. Pigment Yellow 24, C. I. Pigment Yellow 31, C. I. Pigment Yellow 55, C. I. Pigment Yellow 60, C. I. Pigment Yellow 61, C. I. Pigment Yellow 65, C. I. Pigment Yellows 71, C. I. Pigment Yellow 73, C. I. Pigment Yellow 74, C. I. Pigment Yellow 81, C. I. Pigment Yellow 83, C. I. Pigment Yellow 93, C. I. Pigment Yellow 95, C. I. Pigment Yellow 97, C. I. Pigment Yellow 98, C. I. Pigment Yellow 100, C. I. Pigment Yellow 101, C. I. Pigment Yellow 104, C. I. Pigment Yellow 106, C. I. Pigment Yellow 108, C. I. Pigment Yellow 109, C. I. Pigment Yellow 110, C. I. Pigment Yellow 113, C. I. Pigment Yellow 114, C. I. Pigment Yellow 116, C. I. Pigment Yellow 117, C. I. Pigment Yellow 119, C. I. Pigment Yellow 120, C. I. Pigment Yellow 126, C. I. Pigment Yellow 127, C. I. Pigment Yellow 128, C. I. Pigment Yellow 129, C. I. Pigment Yellow 138, C. I. Pigment Yellow 139, C. I. Pigment Yellow 150, C. I. Pigment Yellow 151, C. I. Pigment Yellow 152, C. I. Pigment Yellow 153, C. I. Pigment Yellow 154, C. I. Pigment Yellow 155, C. I. Pigment Yellow 156, C. I. Pigment Yellow 166, C. I. Pigment Yellow 168, C. I. Pigment Yellow 175, C. I. Pigment Yellow 180, and C. I. Pigment Yellow 185;

C. I. Pigment Orange 1, C. I. Pigment Orange 5, C. I. Pigment Orange 13, C. I. Pigment Orange 14, C. I. Pigment Orange 16, C. I. Pigment Orange 17, C. I. Pigment Orange 24, C. I. Pigment Orange 34, C. I. Pigment Orange 36, C. I. Pigment Orange 38, C. I. Pigment Orange 40, C. I. Pigment Orange 43, C. I. Pigment Orange 46, C. I. Pigment Orange 49, C. I. Pigment Orange 51, C. I. Pigment Orange 61, C. I. Pigment Orange 63, C. I. Pigment Orange 64, C. I. Pigment Orange 71, and C. I. Pigment Orange 73; C. I. Pigment Violet 1, C. I. Pigment Violet 19, C. I. Pigment Violet 23, C. I. Pigment Violet 29, C. I. Pigment Violet 32, C. I. Pigment Violet 36, and C. I. Pigment Violet 38;

C. I. Pigment Red 1, C. I. Pigment Red 2, C. I. Pigment Red 3, C. I. Pigment Red 4, C. I. Pigment Red 5, C. I. Pigment Red 6, C. I. Pigment Red 7, C. I. Pigment Red 8, C. I. Pigment Red 9, C. I. Pigment Red 10, C. I. Pigment Red 11, C. I. Pigment Red 12, C. I. Pigment Red 14, C. I. Pigment Red 15, C. I. Pigment Red 16, C. I. Pigment Red 17, C. I. Pigment Red 18, C. I. Pigment Red 19, C. I. Pigment Red 21, C. I. Pigment Red 22, C. I. Pigment Red 23, C. I. Pigment Red 30, C. I. Pigment Red 31, C. I. Pigment Red 32, C. I. Pigment Red 37, C. I. Pigment Red 38, C. I. Pigment Red 40, C. I. Pigment Red 41, C. I. Pigment Red 42, C. I. Pigment Red 48:1, C. I. Pigment Red 48:2, C. I. Pigment Red 48:3, C. I. Pigment Red 48:4, C. I. Pigment Red 49:1, C. I. Pigment Red 49:2, C. I. Pigment Red 50:1, C. I. Pigment Red 52:1, C. I. Pigment Red 53:1, C. I. Pigment Red 57, C. I. Pigment Red 57:1, C. I. Pigment Red 57:2, C. I. Pigment Red 58:2, C. I. Pigment Red 58:4, C. I. Pigment Red 60:1, C. I. Pigment Red 63:1, C. I. Pigment Red 63:2, C. I. Pigment Red 64:1, C. I. Pigment Red 81:1, C. I. Pigment Red 83, C. I. Pigment Red 88, C. I. Pigment Red 90:1, C. I. Pigment Red 97, C. I. Pigment Red 101, C. I. Pigment Red 102, C. I. Pigment Red 104, C. I. Pigment Red 105, C. I. Pigment Red 106, C. I. Pigment Red 108, C. I. Pigment Red 112, C. I. Pigment Red 113, C. I. Pigment Red 114, C. I. Pigment Red 122, C. I. Pigment Red 123, C. I. Pigment Red 144, C. I. Pigment Red 146, C. I. Pigment Red 149, C. I. Pigment Red 150, C. I. Pigment Red 151, C. I. Pigment Red 166, C. I. Pigment Red 168, C. I. Pigment Red 170, C. I. Pigment Red 171, C. I. Pigment Red 172, C. I. Pigment Red 174, C. I. Pigment Red 175, C. I. Pigment Red 176, C. I. Pigment Red 177, C. I. Pigment Red 178, C. I. Pigment Red 179, C. I. Pigment Red 180, C. I. Pigment Red 185, C. I. Pigment Red 187, C. I. Pigment Red 188, C. I. Pigment Red 190, C. I. Pigment Red 193, C. I. Pigment Red 194, C. I. Pigment Red 202, C. I. Pigment Red 206, C. I. Pigment Red 207, C. I. Pigment Red 208, C. I. Pigment Red 209, C. I. Pigment Red 215, C. I. Pigment Red 216, C. I. Pigment Red 220, C. I. Pigment Red 224, C. I. Pigment Red 226, C. I. Pigment Red 242, C. I. Pigment Red 243, C. I. Pigment Red 245, C. I. Pigment Red 254, C. I. Pigment Red 255, C. I. Pigment Red 264, and C. I. Pigment Red 265;

C. I. Pigment Blue 15, C. I. Pigment Blue 15:3, C. I. Pigment Blue 15:4, C. I. Pigment Blue 15:6, and C. I. Pigment Blue 60;

C. I. Pigment Green 7 and C. I. Pigment Green 36;

C. I. Pigment Brown 23, C. I. Pigment Brown 25; and

C. I. Pigment Black 1 and C. I. Pigment Black 7.

In the invention, examples of a preferred combination of the pigments include a combination of C. I. Pigment Red 254 and C. I. Pigment Red 177, C. I. Pigment Red 224, C. I. Pigment Yellow 139, or C. I. Pigment Violet 23; a combination of C. I. Pigment Green 36 and C. I. Pigment Yellow 150, C. I. Pigment Yellow 139, C. I. Pigment Yellow 185, C. I. Pigment Yellow 138, or C. I. Pigment Yellow 180; and a combination of C. I. Pigment Blue 15:6 and C. I. Pigment Violet 23 or C. I. Pigment Blue 60.

In the combination of the pigments, the content of C. I. Pigment Red 254 is preferably 80% by mass or more, particularly preferably 90% by mass or more, the content of C. I. Pigment Green 36 is preferably 50% by mass or more, particularly preferably 60% by mass or more, and the content of C. I. Pigment Blue 15:6 is preferably 80% by mass or more, particularly preferably least 90% by mass or more.

The pigments are preferably used in the form of a dispersion. The dispersion may be prepared by adding and dispersing, into an organic solvent (or vehicle) as described below, a composition that is produced by preliminarily mixing the pigment(s) and a pigment-dispersing agent. The vehicle refers to a medium part of a liquid paint in which the pigment(s) is dispersed. The vehicle is liquid and may contain a component (a binder) for binding the pigment(s) into a coating film and a component (an organic solvent) for dissolving and diluting the binding component. Any dispersing machine may be used in dispersing the pigment(s). Examples of such dispersing machines include conventional dispersing machines such as kneaders, roll mills, attritors, super-mills, dissolvers, homomixers, and sand mills, as described in Kunizo Asakura, "Ganryo no Jiten (Encyclopedia of Pigments)," 1st Edition, Asakura Shoten Co., Ltd., 2000, page 438. Fine grinding may also be performed using friction force from mechanical grinding as described in page 310 of the same literature.

The colorants (pigments) for use in the invention preferably have a number average particle size of 0.001 to 0.1 µm, more preferably of 0.01 to 0.08 µm. Within the above range, an improvement in contrast can preferably be achieved without pigment-induced depolarization. Herein, the term "particle size" refers to the diameter of a circle having an area equal to that of an electron micrograph image of a particle. The term "number average particle size" refers to the average of the particle sizes of 100 particles with respect to the measured particle sizes of many particles.

The contrast of the colored pixels (such as the red, green or blue pixels) according to the invention may be achieved by reducing the particle size of the dispersed pigment. The reduction in particle size may be achieved by controlling the time period for which the pigment is dispersed to form a dispersion. Any of the above known dispersing machines may be used for dispersion. The dispersing time is preferably from 10 to 30 hours, more preferably from 18 to 30 hours, most preferably from 24 to 30 hours. Within the above range of the dispersing time, the particle size of the pigment can be reduced so that the pigment can be prevented from causing depolarization and that a reduction in contrast can be suppressed.

In order to keep the difference between the contrasts of the colored pixels of two or more colors within 600, the particle size of each pigment may be controlled such that the desired contrast can be achieved.

(5) Other Additives

-Solvent-

The colored photosensitive resin composition of the invention may comprise an organic solvent, in addition to the aforementioned components. Examples of the organic solvent include methyl ethyl ketone, propylene glycol monomethyl ether, propylene glycol monomethyl ether acetate, cyclohexanone, cyclohexanol, methyl isobutyl ketone, ethyl lactate, methyl lactate, and caprolactam.

-Surfactant-

In conventional color filters, there was a problem that the color of each pixel is deep in order to realize a high color purity, whereby unevenness of the film thickness of pixels is directly recognized as color unevenness. For this reason, suppression of the film thickness variation upon formation (coating) of a photosensitive resin layer has been desired which directly influences the film thickness of pixels.

In the color filter of the invention or the photosensitive resin transfer material of the invention, the colored photosensitive resin composition preferably comprises a suitable surfactant in order to achieve a uniform film thickness and in order to prevent the coating unevenness (color unevenness caused by variation in the film thickness) effectively.

Preferable examples of the surfactant include surfactants disclosed in JP-A No. 2003-337424 and JP-A No. 11-133600, the disclosures of which are incorporated herein by reference.

-Thermal Polymerization Inhibitor-

In a preferable embodiment, the colored photosensitive resin composition of the invention includes a thermal polymerization inhibitor. Examples of the thermal polymerization inhibitor include hydroquinone, hydroquinone monomethyl ether, p-methoxyphenol, di-t-butyl-p-cresol, pyrogallol, t-butylcatechol, benzoquinone, 4,4'-thiobis(3-methyl-6-t-butylphenol), 2,2'-methylenebis(4-methyl-6-t-butylphenol), 2-mercaptobenzimidazole, and phenothiazine.

-Ultraviolet-Ray Absorber-

If necessary, the colored photosensitive resin composition of the invention may include an ultraviolet-ray absorber. Examples of the ultraviolet-ray absorber include compounds disclosed in JP-A No. 5-72724 (the disclosure of which is incorporated herein by reference), a salicylate-based ultraviolet-ray absorber, a benzophenone-based ultraviolet-ray absorber, a benzotriazole-based ultraviolet-ray absorber, a cyanoacrylate-based ultraviolet-ray absorber, a nickel-chelate-based ultraviolet-ray absorber, and a hindered-amine-based ultraviolet-ray absorber.

Specific examples thereof include phenyl salicylate, 4-t-butyl phenylsalicylate, 2,4-di-t-butyl phenyl-3',5'-di-t-4'-hydroxybenzoate, 4-t-butyl phenylsalicylate, 2,4-dihydroxybenzophenone, 2-hydroxy-4-methoxybenzophenone, 2-hydroxy-4-n-octoxybenzophenone, 2-(2'-hydroxy-5'-methylphenyl)benzotriazole, 2-(2'-hydroxy-3'-t-butyl-5'-methylphenyl)-5-chlorobenzotriazole, ethyl-2-cyano-3,3-diphenyl acrylate, 2,2'-hydroxy-4-methoxybenzophenone, nickel dibutyl dithiocarbamate, bis(2,2,6,6-tetramethyl-4-pyridine)-sebacate, 4-t-butyl phenylsalicylate, phenyl salicylate, 4-hydroxy-2,2,6,6-tetramethylpiperidine condensate, succinic acid-bis(2,2,6,6-tetramethyl-4-piperidenyl)-ester, 2-[2-hydroxy-3,5-bis(α,α-dimethylbenzyl)phenyl]-2H-benzotriazole, and 7-{[4-chloro-6-(diethylamino)-5-triazine-2-yl]amino}-3-phenylcoumarin.

In addition to the aforementioned additives, the colored photosensitive resin composition of the invention may further include an "adhesion auxiliary" described in JP-A No. 11-133600 (the disclosure of which is incorporated herein by reference) and other additives.

Photosensitive Resin Transfer Material

Next, the photosensitive resin transfer material of the invention will be described.

The photosensitive resin transfer material of the invention is preferably formed by using a composite film, similarly to the photosensitive resin transfer material described in JP-A No. 5-72724, the disclosure of which is incorporated herein by reference. The structure of the composite film may be, for example, a lamination in which a temporary support, a thermoplastic resin layer, an intermediate layer, a photosensitive resin layer, and a protective film are disposed in this order.

The photosensitive resin layer of the photosensitive resin transfer material of the invention is formed by using the aforementioned colored photosensitive resin composition of the invention.

Temporary Support

The temporary support is a flexible support which does not deform, shrink, or elongate remarkably even under pressure, or under pressure and heat. Examples of such a temporary support include a polyethylene terephthalate film, a cellulose triacetate film, a polystyrene film, and a polycarbonate film. Among them, a biaxially-stretched polystyrene terephthalate film is particularly preferable.

The thickness of the temporary support is generally, but not limited to, in the range of from 5 to 200 μm, preferably and advantageously from 10 to 150 μm in terms of easy handling and general versatility. The temporary support may be transparent and contain dye-type silicon, alumina sol, a chromium salt, a zirconium salt, or the like.

Thermoplastic Resin Layer

The substance used in the thermoplastic resin layer is preferably an organic polymer substance described in JP-A No. 5-72724 (the disclosure of which is incorporated herein by reference). The substance is more preferably an organic polymer substance having a softening point of about 80° C. or lower according to the Vicat method (specifically, the method of measuring a polymer softening point according to American Material Test Method ASTMD1235, which is incorporated herein by reference). Specifically, the substance may be an organic polymer, and examples thereof include: a polyolefin such as polyethylene or polypropylene; an ethylene copolymer such as a copolymer of ethylene and vinyl acetate or a saponified product thereof; a copolymer of ethylene and acrylic acid ester or a saponified product thereof; polyvinyl chloride; a vinyl chloride copolymer such as a copolymer of vinyl chloride and vinyl acetate or a saponified product thereof; polyvinylidene chloride; a vinylidene chloride copolymer; polystyrene; a styrene copolymer such as a copolymer of styrene and (meth)acrylic acid ester or a saponified product thereof; polyvinyl toluene; a vinyltoluene copolymer such as a copolymer of vinyltoluene and (meth) acrylic acid ester or a saponified product thereof; poly(meth) acrylic acid ester; a (meth)acrylic acid ester copolymer such as a copolymer of butyl(meth)acrylate and vinyl acetate; and a polyamide resin such as a vinyl acetate copolymer nylon, a copolymerized nylon, N-alkoxymethylated nylon, and N-dimethylaminated nylon.

Intermediate Layer

In the photosensitive resin transfer material of the invention, it is preferable to provide an intermediate layer so as to prevent mixing of components during application of a plurality of coating layers and during storage after the application. The intermediate layer is preferably an oxygen blocking film having oxygen blocking function described as "a separating layer" in JP-A No. 5-72724, the disclosure of which is incorporated herein by reference. By using such an oxygen blocking film, the exposure sensitivity is heightened, the time load of the exposing machine is decreased, and the productivity is improved.

The oxygen blocking film is preferably a film with a low oxygen permeability which is dispersible or dissolvable in water or an aqueous alkaline solution. Such a film may be properly selected from known oxygen blocking films. Among them, a combination of polyvinyl alcohol and polyvinylpyrrolidone is particularly preferable.

Protective Film

It is preferable to provide a protective film on a photosensitive resin layer in order to protect the photosensitive resin layer from pollution or damage at storage. The protective layer may be thin. The protective film may comprise a material which is the same as or similar to that of the temporary support. The protective film should be able to be easily separated from the photosensitive resin layer. The protective film material may be, for example, silicone paper, polyolefin sheet or polytetrafluoroethylene sheet.

Method for Preparing Photosensitive Resin Transfer Material

The photosensitive resin transfer material of the invention can be prepared by: coating a temporary support with a coating liquid (coating liquid for thermoplastic resin layer) in which additives for a thermoplastic resin layer are dissolved and drying the coating liquid to form a thermoplastic resin layer; and then coating the thermoplastic resin layer with a coating liquid for an intermediate layer containing a solvent which does not dissolve the thermoplastic resin layer, and drying the coating liquid for an intermediate layer; and then, coating the intermediate layer with a coating liquid for a photosensitive resin layer containing a solvent which does not dissolve the intermediate layer, and drying the coating liquid for a photosensitive resin layer.

In another embodiment, the photosensitive resin transfer material is prepared by: preparing a sheet in which a thermoplastic resin layer and an intermediate layer are disposed on a temporary support, and a sheet in which a photosensitive resin layer is disposed on a protective film; and adhering the sheets to each other such that the intermediate layer and the photosensitive resin layer contact each other. In another embodiment, the photosensitive resin transfer material is prepared by: preparing a sheet in which a thermoplastic resin layer is disposed on a temporary support, and a sheet in which a photosensitive resin layer and an intermediate layer are disposed on a protective film; and adhering the sheets to each other such that the thermoplastic resin layer and the intermediate layer contact each other.

In the photosensitive resin transfer material of the invention, the thickness of the photosensitive resin layer is preferably 1.0 to 5.0 μm, more preferably 1.0 to 4.0 μm, particularly preferably 1.0 to 3.0 μm.

In general, the thickness of the temporary support is preferably 15 to 100 μm, the thickness of the thermoplastic resin layer is preferably 2 to 30 μm, the thickness of the intermediate layer is preferably 0.5 to 3.0 μm, and the thickness of the protective film is preferably 4 to 40 μm. However, the thicknesses of respective layers are not limited to the above range.

Coating operation in the above methods may be performed by a known coating apparatus. In the invention, it is preferable to conduct the coating operation with the coating apparatus using a slit nozzle (slit coater).

Slit Nozzle

The color filter layer according to the invention may be directly formed on a substrate by a process that includes applying the colored photosensitive resin composition by any known coating method and drying the coating or may be formed using the photosensitive resin transfer material. According to the invention, the method of applying the colored photosensitive resin composition to the substrate or the temporary support preferably includes using a slit nozzle having a slit-shaped hole in a part for discharging a liquid, with which the application is performed.

For example, JP-A Nos. 2004-89851, 2004-17043, 2003-170098, 2003-164787, 2003-10767, 2002-79163, and 2001-310147 disclose slit nozzles and slit coaters, which are preferably used. Alternatively, the colored photosensitive resin composition may be applied to the substrate by inkjet method.

Method for Preparing Color Filter Layer

Resin Layer

The red (R), green (G) and blue (B) resin layers of the color filter (layer) according to the invention are preferably formed by using the colored photosensitive resin composition using at least C. I. Pigment Red 254 as a colorant, the colored photosensitive resin composition using at least C. I. Pigment Green 36 as a colorant, and the colored photosensitive resin composition using at least C. I. Pigment Blue 15:6 as a colorant, respectively.

If these conditions are satisfied, high color purity and wide color reproduction properties can be effectively achieved even in a case where the color filter is specifically used for high-contrast, large-screen liquid crystal displays.

The color filter (layer) according to the invention can be produced by a known method such as a method of repeating, until the layers of the respective colors are provided, the process comprising: forming a photosensitive resin layer on a substrate; and exposing and developing the photosensitive resin layer. Black matrix may be introduced so as to partition the color filter into sections, in accordance with the necessity.

In the above production method, formation of the photosensitive resin layer on a substrate may be conducted, for example by (a) applying the respective colored photosensitive resin compositions by a known coating device or by (b) using the photosensitive resin transfer material so as to adhere the photosensitive resin layer by a laminator.

(a) Application by Coating Device

In the method of preparing the color filter according to the invention, the colored photosensitive resin composition may be applied by any known coating method such as spin coating, curtain coating, slit coating, dip coating, air knife coating, roller coating, wire bar coating, gravure coating, and extrusion coating with a hopper as described in U.S. Pat. No. 2,681,294. In particular, the slit coater as described in the section "Photosensitive Resin Transfer Material" is preferably used. Examples of preferred slit coaters include those as described above. The resin layer formed by coating preferably has a thickness of 1.0 to 3.0 μm, more preferably of 1.0 to 2.5 μm, particularly preferably of 1.0 to 2.0 μm.

(b) Adhering by Laminator

Using the photosensitive resin transfer material according to the invention, the resin layer in the form of a film may be bonded or fixed onto the substrate by pressing or heat-pressing it with a heated and/or pressed roller or flat plate as described below. For example, the laminator or laminating method as described in JP-A Nos. 7-110575, 11-77942, 2000-334836, and 2002-148794 may be used. In terms of low contamination, the method described in JP-A No. 7-110575 is preferably used. The resin layer formed from the photosensitive resin transfer material according to the invention preferably has the same thickness as that described in the section <Photosensitive Resin Transfer Material>.

Oxygen-Blocking Film

In the process of preparing the color filter (layer) according to the invention, if a photosensitive resin layer is formed by applying the colored photosensitive resin composition, an oxygen-blocking film may be further formed on the resin layer, which can increase exposure sensitivity. The oxygen-blocking film may be the same as that described above in the section "Intermediate Layer" of "Photosensitive Resin Transfer Material." The thickness of the oxygen-blocking film is preferably, but not limited to, from 0.5 to 3.0 µm.

Exposure and Development

The color filter of the invention can be obtained by repeating, until the resin layers of the respective colors are provided, the process comprising: arranging a predetermined mask over the photosensitive resin layer formed on the substrate; exposing the photosensitive resin layer to light from above the mask which has passed through the mask, the thermoplastic resin layer and the intermediate layer, and then developing the photosensitive resin layer with a developer.

The light source for the exposure can be suitably selected from light sources capable of emitting lights within the wavelength region (e.g. 365 nm, 405 nm, etc.) capable of curing the photosensitive resin layer. Specific examples thereof include an ultrahigh pressure mercury lamp, a high pressure mercury lamp, and a metal halide lamp. The exposure amount is usually about 5 to 200 mJ/cm$^2$, preferably about 10 to 100 mJ/cm$^2$.

The developer is not particularly limited, and may be a known developer such as the developer described in JP-A No. 5-72724, the disclosure of which is incorporated herein by reference. The developer is preferably a developer capable of dissolving the photosensitive resin layer during development; for example, a developer containing a compound with a pKa of 7 to 13 at a concentration of 0.05 to 5 mol/L is preferable. The developer may include a small amount of an organic solvent miscible with water.

Examples of the organic solvent miscible with water include methanol, ethanol, 2-propanol, 1-propanol, butanol, diacetonealcohol, ethylene glycol monomethyl ether, ethylene glycol monoethyl ether, ethylene glycol mono-n-butyl ether, benzyl alcohol, acetone, methyl ethyl ketone, cyclohexanone, ε-caprolactone, γ-butyrolactone, dimethylformamide, dimethylacetamide, hexamethylphosphoramide, ethyl lactate, methyl lactate, ε-caprolactam, and n-methylpyrrolidone. The concentration of the organic solvent is preferably 0.1% by mass to 30% by mass.

A known surfactant may be further added to the developer. The concentration of the surfactant is preferably 0.01% by mass to 10% by mass.

The method of development may be any known method such as puddle development, shower development, shower and spin development, and dip development.

Herein, a description will be given of the shower development. After exposure to light, a developer or developing solution may be sprayed on the resin layer by means of a shower, so that the uncured part can be removed. Before the development, an alkaline liquid having low solubility to the resin layer is preferably sprayed such that the thermoplastic resin layer, the intermediate layer and the like can be removed. After the development, a cleaning agent or the like is preferably sprayed by means of a shower together with scrubbing with a brush or the like to remove development residues.

While the cleaning liquid may be any known cleaner, it is preferably T-SD1 (trade name) manufactured by Fuji Photo Film Co., Ltd. and containing a phosphate salt, a silicate, a nonionic surfactant, an anti-foaming agent, and a stabilizer or T-SD2 (trade name) manufactured by Fuji Photo Film Co., Ltd. and containing sodium carbonate-phenoxyoxyethylene-based surfactant.

The developing solution preferably has a temperature of 20° C. to 40° C. and a pH of 8 to 13.

In terms of reducing cost, the process of preparing the color filter (layer) preferably includes stacking the color filter-forming colored photosensitive resin compositions to form a foundation, forming a transparent electrode thereon, and placing thereon projections for partition and alignment to form spacers, as described in JP-A No. 11-248921 and Japanese Patent No. 3255107.

In the process of sequentially applying and stacking the colored photosensitive resin compositions, the thickness of the film can be reduced for each stacking because of leveling of the coating liquid. Thus, it is preferable that four colors K (black), R, G, and B be stacked and then the projections for partition and orientation be placed thereon. When the photosensitive transfer material having the thermoplastic resin layer is used, the thickness is kept constant, and thus three or two colors are preferably stacked.

The size of the foundation is preferably 25 µm or more, particularly preferably 30 µm or more, in terms of preventing the resin layer from deforming in the process of laminating the transfer material and in terms of keeping a constant thickness.

If necessary, the liquid crystal display of the invention may use a driver or driving circuit for applying a voltage to the electrodes, and/or a reflecting plate, light-guiding plate, dispersion plate, or lens sheet for effectively utilizing light from a backlight source, an optical compensation film, a front protective film, and/or an antireflection film. The liquid crystal display of the invention may also use any known available elements other than the above.

The disclosure of Japanese Patent Application No. 2005-054160 is incorporated herein by reference in its entirety. All publications, patent applications, and technical standards mentioned in this specification are herein incorporated by reference to the same extent as if each individual publication, patent application, or technical standard was specifically and individually indicated to be incorporated by reference.

EXAMPLES

The invention is described in more detail by way of the examples below, which are not intended to limit the scope of the invention. In the examples, "part or parts" and "%" mean "part or parts by mass" and "% by mass", respectively, unless otherwise stated.

Example 1

Production of Color Filter (Production by Application Using Slit Nozzle)

-Formation of Black (K) Image-

A non-alkali glass substrate was washed by a UV washing device, then brush-washed with a cleaner, and then subjected to ultrasonic washing with ultrapure water. The substrate was heat-treated at 120° C. for 3 minutes to stabilize the surface state.

The glass substrate was cooled and its temperature was adjusted to 23° C. Then, the substrate was coated with a colored photosensitive resin composition K1 having a composition shown in the following Table 2 by a coater for a glass substrate (trade name: MH-1600 manufactured by FAS Asia) having a slit nozzle. Subsequently, a part of the solvent was removed by drying with a VCD (vacuum drying apparatus; manufactured by Tokyo Ohka Kogyo Co., Ltd.) for 30 seconds to eliminate the fluidity of the coating layer, then the glass substrate with the coating layer was pre-baked at 120° C. for 3 minutes to give a photosensitive resin layer K1 having a thickness of 2.4 µm.

In a proximity-type exposure system (manufactured by Hitachi High-Technologies Corporation) with an extra-high pressure mercury lamp, the substrate and the mask (an exposure quartz mask having the image pattern) were held in a vertical position and subjected to pattern exposure with a light exposure of 300 mJ/cm² while the distance between the surface of the exposure mask and the photosensitive resin layer was set at 200 μm.

Then, pure water was sprayed through a shower nozzle to uniformly moisten the surface of the photosensitive resin layer K1, and shower developing was performed at 23° C. for 80 seconds with a KOH-based developer (containing KOH and a nonionic surfactant, 10% dilution, trade name: CDK-1, manufactured by Fuji Film Electronic Materials Co., Ltd.) at a flat nozzle pressure of 0.04 MPa to obtain a patterning image. Subsequently, ultrapure water was sprayed through an ultrahigh pressure washing nozzle at a pressure of 9.8 MPa to remove the residue, to obtain a black (K) image. Subsequently, the substrate having the black image thereon was heat-treated at 220° C. for 30 minutes.

-Formation of Red (R) Pixels-

The colored photosensitive resin composition R1 shown below was used to form heat-treated red (R) pixels on the substrate having the K image by the same process as for the formation of the black (K) image.

-Formation of Green (G) Pixels-

The colored photosensitive resin composition G1 shown below was used to form heat-treated green (G) pixels on the substrate having the K image and the R pixels by the same process as for the formation of the black (K) image.

-Formation of Blue (B) Pixels-

The colored photosensitive resin composition B1 shown below was used to form heat-treated blue (B) pixels on the substrate having the K image and the R and G pixels by the same process as for the formation of the black (K) image, so that the desired color filter was obtained.

Preparation of Colored Photosensitive Resin Compositions

Preparation of colored photosensitive resin compositions K1, R1, R11, G1, G11, B1, and B11 is described below.

-Preparation of Colored Photosensitive Resin Composition K1-

K (black) pigment dispersion 1 and propylene glycol monomethyl ether acetate were weighed in the amounts as shown in Table 1, respectively and mixed at a temperature of 24° C. (±2° C.) and stirred at 150 rpm for 10 minutes. Subsequently, methyl ethyl ketone, Binder 1, hydroquinone monomethyl ether, a DPHA solution, 2,4-bis(trichloromethyl)-6-[4'-(N,N-bisethoxycarbonylmethyl)amino-3'-bromophenyl]-s-triazine, and Surfactant 1 were weighed in the amounts as shown in Table 1, respectively and added in this order at a temperature of 25° C. (±2° C.) and stirred at a temperature of 40° C. (±2° C.) at 150 rpm for 30 minutes so that the colored photosensitive resin composition K1 was obtained. Each addition amount is shown in Table 1.

TABLE 1

| Colored photosensitive resin composition | K1 |
|---|---|
| Black (K) pigment dispersion 1 | 25 |
| Propylene glycol monomethyl ether acetate | 8.0 |
| Methyl ethyl ketone | 53 |
| Binder 1 | 9.1 |
| Hydroquinone monomethyl ether | 0.002 |
| DPHA solution | 4.2 |

TABLE 1-continued

| Colored photosensitive resin composition | K1 |
|---|---|
| 2,4-bis(trichloromethyl)-6-[4'-(N,N-bisethoxycarbonylmethyl)amino-3'-bromophenyl]-s-triazine | 0.16 |
| Surfactant 1 | 0.044 |

<Unit: parts by mass>

The black pigment dispersion 1 was prepared by mixing the following components:

| | |
|---|---|
| Carbon black (trade name: NIPX35, manufactured by Degussa | 13.1 parts |
| N,N'-bis-(3-diethylaminopropyl)-5-{4-[2-oxo-1-(2-oxo-2,3-dihydro-1H-benzimidazole-5-ylcarbamoyl)-propylazo]-benzoylamino}-isophthalamide | 0.65 parts |
| Polymer (a random copolymer of benzyl methacrylate and methacrylic acid (72:28 in molar ratio) with a weight average molecular weight of 37000) | 6.72 parts |
| Propylene glycol monomethyl ether acetate | 79.53 parts |

-Preparation of Colored Photosensitive Resin Compositions R1 and R11-

R pigment dispersion 1, R pigment dispersion 2, and propylene glycol monomethyl ether acetate were weighed in the amounts as shown in Table 2, respectively and mixed at a temperature of 24° C. (±2° C.) and stirred at 150 rpm for 10 minutes. Subsequently, methyl ethyl ketone, Binder 2, a DPHA solution, 2-trichloromethyl-5-(p-styrylstyryl)-1,3,4-oxadiazole, 2,4-bis(trichloromethyl)-6-[4'-(N,N-bisethoxycarbonylmethyl)amino-3'-bromophenyl]-s-triazine, and phenothiazine were weighed in the amounts as shown in Table 2, respectively and added in this order at a temperature of 24° C. (±2° C.) and stirred at 150 rpm for 30 minutes. Surfactant 1 (and ED152 for the colored photosensitive resin composition R11) was further weighed and added at a temperature of 24° C. (±2° C.) and stirred at 30 rpm for 5 minutes. The product was filtered through nylon mesh #200 to give the colored photosensitive resin composition. Each addition amount is shown in Table 2.

TABLE 2

| | Present invention | |
|---|---|---|
| Material name | R1 | R11 |
| R pigment dispersion 1 | 44.00 | 44.00 |
| R pigment dispersion 2 | 5.00 | 5.00 |
| Propylene glycol monomethyl ether acetate | 7.60 | 7.60 |
| Methyl ethyl ketone | 37.00 | 37.00 |
| Binder 2 | 0.70 | 0.80 |
| DPHA solution | 3.80 | 4.40 |
| 2-trichloromethyl-5-(p-styrylstyryl)-1,3,4-oxadiazole | 0.12 | 0.14 |
| 2,4-bis(trichloromethyl)-6-[4'-(N,N-bisethoxycarbonylmethyl)amino-3'-bromophenyl]-s-triazine | 0.05 | 0.06 |
| Phenothiazine | 0.010 | 0.010 |
| Surfactant 1 | 0.06 | 0.06 |
| ED152 | — | 0.52 |

Unit: parts by mass

Preparation of R Pigment Dispersions 1 and 2

The components for R pigment dispersion 1 or 2 shown below were dispersed at a peripheral speed of 12.5 m/sec for 21 hours using a motor mill (trade name: M-50, manufactured by Eiger Japan) and CIP-treated zirconia beads with a diameter of 0.30 mm so that each of the dispersions was prepared.

(Composition of R Pigment Dispersion 1)

| | |
|---|---|
| C.I. Pigment Red 254 (trade name: Ingaphor Red B-CF, manufactured by Ciba Specialty Chemicals K.K.) | 8 parts |
| N,N'-bis-(3-diethylaminopropyl)-5-{4-[2-oxo-1-(2-oxo-2,3-dihydro-1H-benzimidazole-5-ylcarbamoyl)-propylazo]-benzoylamino}-isophthalamide | 0.8 parts |
| Polymer (a random copolymer of benzyl methacrylate and methacrylic acid (72:28 in molar ratio) with a weight average molecular weight of 37000) | 8 parts |
| Propylene glycol monomethyl ether acetate | 83.2 parts |

(Composition of R Pigment Dispersion 2)

| | |
|---|---|
| C.I. Pigment Red 177 (trade name: Cromophtal Red A2B, manufactured by Ciba Specialty Chemicals K.K.) | 18 parts |
| Polymer (a random copolymer of benzyl methacrylate and methacrylic acid (72:28 in molar ratio) with a weight average molecular weight of 37000) | 12 parts |
| Propylene glycol monomethyl ether acetate | 70 parts |

Preparation of Colored Photosensitive Resin Compositions G1 and G11

G pigment dispersion 1, Y pigment dispersion 1, and propylene glycol monomethyl ether acetate were weighed in the amounts as shown in Table 3, respectively and mixed at a temperature of 24° C. (±2° C.) and stirred at 150 rpm for 10 minutes. Subsequently, methyl ethyl ketone, cyclohexanone, Binder 1, a DPHA solution, 2-trichloromethyl-5-(p-styrylstyryl)-1,3,4-oxadiazole, 2,4-bis(trichloromethyl)-6-[4'-(N,N-bisethoxycarbonylmethyl)amino-3'-bromophenyl]-s-triazine, and phenothiazine were weighed in the amounts as shown in Table 3, respectively and added in this order at a temperature of 24° C. (±2° C.) and stirred at 150 rpm for 30 minutes. Surfactant 1 was further weighed and added at a temperature of 24° C. (±2° C.) and stirred at 30 rpm for 5 minutes. The product was filtered through nylon mesh #200 to give the colored photosensitive resin composition. Each addition amount is shown in Table 3.

TABLE 3

| | Present Invention | |
|---|---|---|
| Material Name | G1 | G11 |
| G pigment dispersion 1 | 23.70 | 23.70 |
| Y pigment dispersion 1 | 12.50 | 12.50 |
| Propylene glycol monomethyl ether acetate | 29.10 | 29.10 |
| Methyl ethyl ketone | 26.00 | 26.00 |
| Cyclohexanone | 1.30 | 1.30 |
| Binder 1 | 2.50 | 3.00 |
| DPHA solution | 3.50 | 4.30 |
| 2-trichloromethyl-5-(p-styrylstyryl)-1,3,4-oxadiazole | 0.12 | 0.15 |
| 2,4-bis(trichloromethyl)-6-[4'-(N,N-bisethoxycarbonylmethyl)amino-3'-bromophenyl]-s-triazine | 0.05 | 0.06 |
| Phenothiazine | 0.005 | 0.005 |
| Surfactant 1 | 0.07 | 0.07 |

Unit: parts by mass

Preparation of G Pigment Dispersion 1 and Y Pigment Dispersion 1

The components for G pigment dispersion 1 or Y pigment dispersion 1 shown below were dispersed at a peripheral speed of 12.5 m/sec for 19 hours (for G pigment dispersion) or 22 hours (for Y pigment dispersion) using a motor mill (trade name: M-50, manufactured by Eiger Japan) and CIP-treated zirconia beads with a diameter of 0.30 mm so that each of the dispersions was prepared.

(Composition of G Pigment Dispersion 1)

| | |
|---|---|
| C.I. Pigment Green 36 (trade mark: Rionol Green 6YK, manufactured by Toyo Ink Mfg. Co., Ltd.) | 14 parts |
| Polymer (a random copolymer of benzyl methacrylate and methacrylic acid (72:28 in molar ratio) with a weight average molecular weight of 37000) | 23 parts |
| N,N'-bis-(3-diethylaminopropyl)-5-{4-[2-oxo-1-(2-oxo-2,3-dihydro-1H-benzimidazole-5-ylcarbamoyl)-propylazo]-benzoylamino}-isophthalamide | 1.4 parts |
| Propylene glycol monomethyl ether acetate | 61.6 parts |

(Composition of Y Pigment Dispersion 1)

| | |
|---|---|
| C.I. Pigment Yellow 150 (trade name: Bayplast Yellow 5GN 01, manufactured by Bayer Ltd.) | 15 parts |
| Polymer (a random copolymer of benzyl methacrylate and methacrylic acid (72:28 in molar ratio) with a weight average molecular weight of 37000) | 9 parts |
| N,N'-bis-(3-diethylaminopropyl)-5-{4-[2-oxo-1-(2-oxo-2,3-dihydro-1H-benzimidazole-5-ylcarbamoyl)-propylazo]-benzoylamino}-isophthalamide | 1.5 parts |
| Propylene glycol monomethyl ether acetate | 74.5 parts |

Preparation of Colored Photosensitive Resin Compositions B1 and B11

B pigment dispersion 1, and propylene glycol monomethyl ether acetate were weighed as shown in Table 4, respectively and mixed at a temperature of 24° C. (±2° C.) and stirred at 150 rpm for 10 minutes. Subsequently, methyl ethyl ketone, Binder 3, a DPHA solution, 2-trichloromethyl-5-(p-styrylstyryl)-1,3,4-oxadiazole, and phenothiazine were weighed as shown in Table 4, respectively and added in this order at a temperature of 25° C. (±2° C.) and stirred at a temperature of 40° C. (±2° C.) at 150 rpm for 30 minutes. Surfactant 1 was further weighed in the amount as shown in Table 4 and added at a temperature of 24° C. (±2° C.) and stirred at 30 rpm for 5 minutes. The product was filtered through nylon mesh #200 to give the colored photosensitive resin composition. Each addition amount is shown in Table 4.

TABLE 4

| | Present Invention | |
|---|---|---|
| Material Name | B1 | B11 |
| B pigment dispersion 1 | 22.00 | 22.00 |
| Propylene glycol monomethyl ether acetate | 28.00 | 28.00 |
| Methyl ethyl ketone | 26.00 | 26.00 |
| Binder 3 | 17.30 | 18.50 |
| DPHA solution | 4.00 | 4.30 |
| 2-trichloromethyl-5-(p-styrylstyryl)-1,3,4-oxadiazole | 0.16 | 0.17 |
| Phenothiazine | 0.02 | 0.02 |
| Surfactant 1 | 0.06 | 0.06 |

Unit: parts by mass

Preparation of B Pigment Dispersions 1

The components for B pigment dispersion 1 shown below were dispersed at a peripheral speed of 12.5 m/sec for 19 hours using a motor mill (trade name: M-50, manufactured by Eiger) and CIP-treated zirconia beads with a diameter of 0.30 mm so that each of the dispersions was prepared.

(Composition of B Pigment Dispersion 1)

| | |
|---|---|
| C.I. Pigment Blue 15:6 (trade name: Rionol Blue ES, manufactured by Toyo Ink Mfg. Co., Ltd.) | 11.28 parts |
| C.I. Pigment Violet 23 (trade name: Hostaperm Violet RL-NF, manufactured by Clariant (Japan) K.K.) | 0.72 parts |
| EFKA-745 (manufactured by EFKA ADDITIVES B. V.) | 0.6 parts |
| DISPARLON DA-725 (manufactured by Kusumoto Chemicals, Ltd.) | 0.75 parts |
| Propylene glycol monomethyl ether acetate | 86.65 parts |

The composition of Binder 1 is as follows:

| | |
|---|---|
| Polymer (a random copolymer of benzyl methacrylate and methacrylic acid (78:22 in molar ratio) with a weight average molecular weight of 40000) | 27 parts |
| Propylene glycol monomethyl ether acetate | 73 parts |

The composition of Binder 2 is as follows:

| | |
|---|---|
| Polymer (a random copolymer of benzyl methacrylate, methacrylic acid and methyl methacrylate (38:25:37 in molar ratio) with a weight average molecular weight of 30000) | 27 parts |
| Propylene glycol monomethyl ether acetate | 73 parts |

The composition of Binder 3 is as follows:

| | |
|---|---|
| Polymer (a random copolymer of benzyl methacrylate, methacrylic acid and methyl methacrylate (36:22:42 in molar ratio) with a weight average molecular weight of 30000) | 27 parts |
| Propylene glycol monomethyl ether acetate | 73 parts |

The composition of the DPHA solution is as follows:

| | |
|---|---|
| Dipentaerythritol hexaacrylate (trade name: KAYARAD DPHA, manufactured by Nippon Kayaku Co., Ltd., containing 500 ppm of a polymerization-inhibitor MEHQ) | 76 parts |
| Propylene glycol monomethyl ether acetate | 24 parts |

The composition of Surfactant 1 (MEGAFAC F780F, manufactured by Dainippon Ink and Chemicals, Incorporated.) is as follows:

| | |
|---|---|
| A copolymer of 40 parts of $C_6F_{13}CH_2CH_2OCOCH=CH_2$, 55 parts of $H(OCH(CH_3)CH_2)_7OCOCH=CH_2$ and 5 parts of $H(OCH_2CH_2)_7OCOCH=CH_2$, with a weight average molecular weight of 30000 | 30 parts |
| Methyl ethyl ketone | 70 parts |

ED152 was a special phosphate ester activator (trade name: HIPLAAD ED152, manufactured by Kusumoto Chemicals, Ltd.).

Preparation of Liquid Crystal Display

Resin spacers were formed on the pixels of the color filter prepared as described above.

A transparent ITO (Indium Tin Oxide) electrode layer was then formed and patterned in PVA mode.

A polyimide oriented film was further formed thereon. A sealing material of epoxy resin was applied to the part corresponding to the outer frame of a black matrix provided around the pixel group of the color filter, and a liquid crystal for PVA mode was added dropwise in vacuum. After a counter substrate was stacked thereon, the pressure was increased to the atmospheric pressure for pressure bonding so that a liquid crystal cell was obtained.

The bonded glass substrates were then treated with ultraviolet light such that the sealing material was cured.

Polarization plates HLC2-2518 manufactured by Sanritz Corporation were bonded on both sides of the resulting liquid crystal cell in a crossed-Nicols arrangement. A sidelight type backlight was constructed using a red (R) LED FR1112H (a chip type LED manufactured by STANLEY ELECTRIC Co., Ltd.), a green (G) LED DG1112H (a chip type LED manufactured by STANLEY ELECTRIC Co., Ltd.) and a blue (B) LED DB1112H (a chip type LED manufactured by STANLEY ELECTRIC Co., Ltd.). The backlight was placed on the back side of the liquid crystal cell equipped with the polarization plates to form a 25-inch screen liquid crystal display.

Examples 2 to 4

A liquid crystal display was prepared using the process of Example 1 except that the screen size was set at 20, 15 or 10 inches in place of 25 inches for the preparation of the liquid crystal display of Example 1.

Example 5

Production of Color Filter (Production by Lamination of Photosensitive Resin Transfer Material)

-Production of Photosensitive Resin Transfer Material-

A thermoplastic resin layer coating liquid having the following formulation H1 was coated on a polyethylene terephthalate film temporary support with a thickness of 75 μm using a slit nozzle, followed by drying. Then, an intermediate layer coating liquid having the following formulation P1 was coated thereon, and dried. Further, the colored photosensitive resin composition K1 was coated thereon and dried. In this way, a thermoplastic resin layer with a dry film thickness of 14.6 μm, an intermediate layer with a dry film thickness of 1.6 μm, and a photosensitive resin layer with a dry film thickness of 2.4 μm were provided on the temporary support. Further, a protective film (polypropylene film with a thickness of 12 μm) was adhered onto the photosensitive resin layer by pressure.

As described above, a photosensitive resin transfer material K1 was produced in which the temporary support, the thermoplastic resin layer, the intermediate layer (oxygen blocking film), and the black (K) photosensitive resin layer were unified.

(Coating Liquid for Thermoplastic Resin Layer: Formulation H1)

| | |
|---|---|
| Methanol | 11.1 parts |
| Propylene glycol monomethyl ether | 6.36 parts |
| Methyl ethyl ketone | 52.4 parts |
| A copolymer of methyl methacrylate, 2-ethylhexyl acrylate, benzyl methacrylate, and methacrylic acid (55:11.7:4.5:28.8 in molar ratio) (weight average molecular weight: 100000, Tg: about 70° C.) | 5.83 parts |

-continued

| | |
|---|---|
| A copolymer of styrene and acrylic acid (63:37 in molar ratio) (weight average molecular weight: 10000, Tg: about 100° C.) | 13.6 parts |
| A compound product of dehydration and condensation of bisphenol A with 2 equivalents of pentaethylene glycol monomethacrylate (trade name: 2,2-bis[4-methacryloxypolyethoxy]phenyl)propane, manufactured by Shin-nakamura Chemical Corporation) | 9.1 parts |
| Fluoropolymer (a copolymer of 40 parts of $C_6F_{13}CH_2CH_2OCOCH=CH_2$, 55 parts of $H(OCH(CH_3)CH_2)_7OCOCH=CH_2$ and 5 parts of $H(OCH_2CH_2)_7OCOCH=CH_2$, trade name: MEGAFAC F780F, manufactured by Dainippon Ink and Chemicals, Incorporated, weight average molecular weight: 30000, 30% methyl ethyl ketone solution) | 0.54 parts |

(Coating Liquid for Intermediate Layer: Formulation P1)

| | |
|---|---|
| PVA 205 (polyvinyl alcohol manufactured by Kuraray Co., Ltd., saponification degree: 88%, polymerization degree: 550) | 32.2 parts |
| Polyvinylpyrrolidone (trade name: K-30, manufactured by ISP Japan Ltd.) | 14.9 parts |
| Distilled water | 524 parts |
| Methanol | 429 parts |

Preparation of Photosensitive Resin Transfer Materials R11, G11 and B11

Photosensitive resin transfer material R11, G11 or B11 was prepared using the process of preparing the photosensitive resin transfer material K1 except that the colored photosensitive resin composition was changed from K1 to R11, G11 or B11.

-Formation of Black (K) Image-

An alkali-free glass substrate was washed with a rotary brush with nylon bristles, while a glass cleaner liquid controlled at 25° C. was sprayed on the substrate for 20 seconds by means of a shower. After washing with a pure water shower, a silane coupling liquid (an aqueous solution of 0.3% N-β(aminoethyl)γ-aminopropyltrimethoxysilane, trade name: KBM603, manufactured by Shin-Etsu Chemical Co., Ltd.) was sprayed on the substrate for 20 seconds by means of a shower, and then the substrate was cleaned with a pure water shower. The resulting substrate was heated at 100° C. for 2 minutes in a substrate pre-heater and then fed to a laminator.

After the protective film was removed from the photosensitive resin transfer material K1, the laminator (Lamic II model manufactured by Hitachi High-Tech Electronics Engineering Co., Ltd.) was used to laminate the material K1 and the substrate (pre-heated at 100° C.) at a rubber roller temperature of 130° C., a linear pressure of 100 N/cm, and a traveling speed of 2.2 m/minute.

The temporary support was peeled off, and then in a proximity-type exposure system (manufactured by Hitachi High-Technologies Corporation) with an extra-high pressure mercury lamp, the substrate and the mask (an exposure quartz mask having the image pattern) were held in a vertical position and subjected to pattern exposure with a light exposure of 70 mJ/cm$^2$ while the distance between the surface of the exposure mask and the photosensitive resin layer was set at 200 μm.

Shower development was then performed at 30° C. under a flat nozzle pressure of 0.04 MPa for 50 seconds with a triethanolamine-based developing solution (a solution prepared with a composition of 30% by mass triethanolamine and a combined total of 0.1% by mass polypropylene glycol, glycerol monostearate, polyoxyethylene sorbitan monostearate and stearyl ether, with the remainder being pure water, and with a stock solution that has been stored being diluted with twelve parts pure water (such that 1% by mass part of the stock solution is mixed with 11% by mass parts of pure water)) so that the thermoplastic resin layer and the intermediate layer (oxygen-blocking film) were removed.

Subsequently, a sodium carbonate-based developing solution (trade name: T-CD1, manufactured by Fuji Photo Film Co., Ltd., containing 0.38 mol/liter of sodium hydrogen carbonate, 0.47 mol/liter of sodium carbonate, 5% by mass of sodium dibutylnaphthalenesulfonate, an anionic surfactant, an anti-foaming agent, and a stabilizer, and diluted with 5 parts pure water) was used in performing shower development at 29° C. under a cone-shaped nozzle pressure of 0.15 MPa for 30 seconds so that the photosensitive resin layer was developed to form a patterned image.

Subsequently, a cleaning agent (trade name: T-SD1, manufactured by Fuji Photo Film Co., Ltd., containing a phosphate, a silicate, a non-ionic surfactant, an anti-foaming agent, and a stabilizer, and diluted with 10 parts pure water) was used together with a rotary brush with nylon bristles and a shower at 33° C. under a cone-shaped nozzle pressure of 0.02 MPa for 20 seconds to remove the residue, so that a black (K) image was obtained. Thereafter, the resin layer side of the substrate was subjected to post exposure at 500 mJ/cm$^2$ to light from an extra-high pressure mercury lamp and then heat-treated at 220° C. for 15 minutes.

The substrate having the black (K) image was washed with the brush again in the same manner and washed with a pure water shower and then fed to the substrate pre-heater without using the silane coupling agent.

-Formation of Red (R) Pixels-

Heat-treated red (R) pixels were prepared using the process of forming the K image except that the substrate having the K image, the photosensitive resin transfer material R1 and the R pixel-forming mask were used in place of the substrate, the photosensitive resin transfer material K1 and the K image-forming mask and that the light exposure was 40 mJ/cm$^2$, the development with the sodium carbonate-based developing solution was performed at 35° C. for 35 seconds, and the heat-treatment was performed at 220° C. for 15 minutes.

The substrate having the K image and the R pixels was washed with the brush again in the same manner and washed with a pure water shower and then fed to the substrate pre-heater without using the silane coupling liquid.

-Formation of Green (G) Pixels-

Heat-treated green (G) pixels were prepared using the process of forming the K image except that the substrate having the K image and the R pixels, the photosensitive resin transfer material G1 and the G pixel-forming mask were used in place of the substrate, the photosensitive resin transfer material K1 and the K image-forming mask and that the light exposure was 40 mJ/cm$^2$, the development with the sodium carbonate-based developing solution was performed at 34° C. for 45 seconds, and the heat-treatment was performed at 220° C. for 15 minutes.

The substrate having the K image and the R and G pixels was washed with the brush again in the same manner and washed with a pure water shower and then fed to the substrate pre-heater without using the silane coupling liquid.

-Formation of Blue (B) Pixels-

Heat-treated blue (B) pixels were prepared using the process of forming the K image except that the substrate having the K image and the R and G pixels, the photosensitive resin transfer material B1 and the B pixel-forming mask were used in place of the substrate, the photosensitive resin transfer material K1 and the K image-forming mask and that the light exposure was 30 mJ/cm$^2$, and the development with the sodium carbonate-based developing solution was performed at 36° C. for 40 seconds.

The substrate having the K image and the R, G and B pixels was baked at 240° C. for 50 minutes, so that the desired color filter was obtained.

Preparation of Liquid Crystal Display

A liquid crystal display was prepared using the process of Example 1 except that the color filter as prepared above was used in place of the color filter prepared using the slit nozzle.

Examples 6 to 8

A liquid crystal display was prepared using the process of Example 5 except that the screen size was set at 20, 15 or 10 inches in place of 25 inches for the preparation of the liquid crystal display of Example 5.

Examples 9 to 12 and Comparative Example 1

A liquid crystal display was prepared using the process of Example 2 except that the time for dispersing each of the colored photosensitive resin compositions R1, G1 and B1 was changed as shown in Table 6 from the dispersing time for the preparation of the color filter of Example 2.

Comparative Examples 2 to 7

A liquid crystal display was prepared using the process of Comparative Example 1 except that the dispersing time was changed as shown in Table 6 from the dispersing time for the preparation of the color filter of Comparative Example 1 and that the cold-cathode tube as shown in Table 6 was used in place of the backlight for the preparation of the liquid crystal display of Comparative Example 1.

Examples 13 to 15

A liquid crystal display was prepared using the process of Example 2 except that the polarization plate was changed as shown in Table 7 from that for the preparation of the liquid crystal display of Example 2.

Evaluation

-Measurement of Contrast-

The pixels of each color constituting each resulting color filter (layer) were measured for contrast by the method as described below, and the difference between the pixels of the respective colors was calculated. The results are shown in Tables 5 to 7.

(Method of Measuring Contrast)

Three-wavelength cold-cathode tube was used as a backlight. Each color filter was placed between two polarization plates (trade name: G1220DUN, manufactured by NITTO DENKO CORPORATION), and the X value of the chromaticity of light passing through the resulting laminate with the polarization plates arranged in a parallel configuration was divided by the X value of the chromaticity of light passing through the resulting laminate with the polarization plates arranged in a crossed-Nicols configuration to produce a contrast with respect to the X value. With respect to each of the Y and Z values, measurement was performed in the same manner to determine a contrast for each of the Y and Z values. The measurement of the chromaticity was performed using a color vividness tester (trade name: BM-5, manufactured by TOPCON CORPORATION).

Regarding the placement positions of the two polarization plates, the color filters and the color vividness tester, a polarization plate is placed at a position 13 mm from the backlight and a cylinder of diameter 11 mm and length 20 mm is placed at a position between 40 mm and 60 mm from the backlight, and the light that passes therethrough is irradiated on a measurement sample placed at a position 65 mm from the backlight, and light that passes therethrough is measured with a color vividness tester placed at a position 400 mm from the backlight through a polarization plate placed at a position 100 mm from the backlight. The measurement angle of the color vividness tester is set at 2°. The light quantity of the backlight is set so that the brightness thereof is 1280 cd/m$^2$ when the two polarization plates are placed in a parallel-Nicols configuration with no sample placed therebetween.

[Method of Measuring Chromaticity]

A microspectrophotometer (trade name: OSP-100, manufactured by OLYMPUS OPTICAL CO., LTD.) with its pinhole diameter set at 5 μm was used to measure a transmission spectrum, and the result was used to calculate a chromaticity for the 2° field of view with illuminant C (see Noboru Ohta, "Color Optics," 2nd Edition, Tokyo Denki University Press, page 73).

[Method of Color Purity Evaluation]

A solid color was displayed on each liquid crystal display, and the chromaticity of the color was measured with the color vividness tester. From the resulting chromaticities of the respective RGB colors, a color reproduction range was determined as a relative ratio to the NTSC ratio standard.

[Method of Vividness Evaluation]

Sensory evaluation of vividness was performed by 50 testers on each liquid crystal display panel (display) using each of the color filters prepared in Examples and Comparative Examples, on which a color chart was displayed with black background. The degree of vividness was rated on a 1 to 5 scale (5 being vividest), and the average value was used as an evaluation value. The results are shown in Tables 5 to 7.

TABLE 5

|  |  |  | Example 1 | Example 2 | Example 3 | Example 4 | Example 5 | Example 6 | Example 7 | Example 8 |
|---|---|---|---|---|---|---|---|---|---|---|
| Color Filter Layer | Preparation Method |  | Coating with Slit nozzle | | | | Lamination of Photosensitive Transfer Material | | | |
|  | Pigment Dispersing Time (hours) | R | 21 | | | | 21 | | | |
|  |  | G | 19 | | | | 19 | | | |
|  |  | B | 19 | | | | 19 | | | |
|  |  | Y | 22 | | | | 22 | | | |

TABLE 5-continued

|  |  |  | Example 1 | Example 2 | Example 3 | Example 4 | Example 5 | Example 6 | Example 7 | Example 8 |
|---|---|---|---|---|---|---|---|---|---|---|
|  | G | x |  |  |  | 0.278 |  |  |  | 0.278 |
|  | Chromaticity | y |  |  |  | 0.604 |  |  |  | 0.604 |
|  | R | x |  |  |  | 0.657 |  |  |  | 0.657 |
|  | Chromaticity | y |  |  |  | 0.330 |  |  |  | 0.330 |
|  | B | x |  |  |  | 0.137 |  |  |  | 0.137 |
|  | Chromaticity | y |  |  |  | 0.102 |  |  |  | 0.102 |
|  | Contrast | X |  |  |  | 3000 |  |  |  | 3000 |
|  |  | Y |  |  |  | 3000 |  |  |  | 3000 |
|  |  | Z |  |  |  | 3000 |  |  |  | 3000 |
| Backlight | Type | R | FR1112H (LED Manufactured by STANLEY ELECTRIC Co., Ltd.) | | | | | | | |
|  |  | G | DG1112H (LED Manufactured by STANLEY ELECTRIC Co., Ltd.) | | | | | | | |
|  |  | B | DB1112H (LED Manufactured by STANLEY ELECTRIC Co., Ltd.) | | | | | | | |
|  | Peak | R | 633 nm | | | | | | | |
|  | Wavelength | G | 531 nm | | | | | | | |
|  |  | B | 472 nm | | | | | | | |
| Polarization plate | Type |  | HLC2-2518 (Sanritz Corporation) | | | | | | | |
|  | Polarization Degree |  | 99.991 | | | | | | | |
|  | Screen Size |  | 25 inches | 20 inches | 15 inches | 10 inches | 25 inches | 20 inches | 15 inches | 10 inches |
| Evaluation Results | Color Purity (NTSC Ratio) |  |  |  | 100 |  |  |  | 100 |  |
|  | Vividness |  | 4.9 | 4.8 | 4.0 | 3.5 | 4.9 | 4.9 | 4.0 | 3.5 |

TABLE 6

|  |  |  | Example 9 | Example 10 | Example 11 | Example 12 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|---|---|
| Color Filter Layer | Preparation Method |  | Coating with Slit nozzle | | | | | | | | | | |
|  | Pigment | R | 17 | 13 | 10 | 7 | 3 | 21 | 17 | 13 | 10 | 7 | 3 |
|  | Dispersing | G | 15 | 12 | 8 | 5 | 2 | 19 | 15 | 12 | 8 | 5 | 2 |
|  | Time (hours) | B | 15 | 12 | 9 | 5 | 2 | 19 | 15 | 12 | 9 | 5 | 2 |
|  |  | Y | 19 | 15 | 11 | 7 | 3 | 22 | 19 | 15 | 11 | 7 | 3 |
|  | G | x |  |  |  |  | 0.278 |  |  |  |  |  |  |
|  | Chromaticity | y |  |  |  |  | 0.604 |  |  |  |  |  |  |
|  | R | x |  |  |  |  | 0.657 |  |  |  |  |  |  |
|  | Chromaticity | y |  |  |  |  | 0.330 |  |  |  |  |  |  |
|  | B | x |  |  |  |  | 0.137 |  |  |  |  |  |  |
|  | Chromaticity | y |  |  |  |  | 0.102 |  |  |  |  |  |  |
|  | Contrast | X | 2500 | 2000 | 1500 | 1000 | 500 | 3000 | 2500 | 2000 | 1500 | 1000 | 500 |
|  |  | Y | 2500 | 2000 | 1500 | 1000 | 500 | 3000 | 2500 | 2000 | 1500 | 1000 | 500 |
|  |  | Z | 2500 | 2000 | 1500 | 1000 | 500 | 3000 | 2500 | 2000 | 1500 | 1000 | 500 |
| Backlight | Type | R | FR1112H (LED Manufactured by STANLEY ELECTRIC Co., Ltd.) | | | | | Cold-Cathode Tube (having an emission spectrum equivalent to that of F10 light source, manufactured by HARISON TOSHIBA LIGHTING CORP.) | | | | | |
|  |  | G | DG1112H (LED Manufactured by STANLEY ELECTRIC Co., Ltd.) | | | | | | | | | | |
|  |  | B | DB1112H (LED Manufactured by STANLEY ELECTRIC Co., Ltd.) | | | | | | | | | | |
|  | Peak | R | 633 nm | | | | | 435 nm | | | | | |
|  | Wavelength | G | 531 nm | | | | | 545 nm | | | | | |
|  |  | B | 472 nm | | | | | 610 nm | | | | | |
| Polarization plate | Type |  | HLC2-2518 (Sanritz Corporation) | | | | | | | | | | |
|  | Polarization Degree |  | 99.991 | | | | | | | | | | |
|  | Screen Size |  | 20 inches | | | | | | | | | | |
| Evaluation Results | Color Purity (NTSC Ratio) |  |  | 100 |  |  |  |  | 70 |  |  |  |  |
|  | Vividness |  | 4.6 | 4.1 | 3.7 | 3.0 | 1.5 | 2.0 | 1.9 | 1.8 | 1.7 | 1.6 | 1.2 |

TABLE 7

|  |  |  | Example 13 | Example 14 | Example 15 |
|---|---|---|---|---|---|
| Color Filter Layer | Preparation Method |  | Coating with Slit nozzle | | |
|  | Pigment | R |  | 21 |  |
|  | Dispersing Time | G |  | 19 |  |
|  | (hours) | B |  | 19 |  |
|  |  | Y |  | 22 |  |
|  | G Chromaticity | x |  | 0.278 |  |
|  |  | y |  | 0.604 |  |

TABLE 7-continued

|  |  |  | Example 13 | Example 14 | Example 15 |
|---|---|---|---|---|---|
|  | R Chromaticity | x |  | 0.657 |  |
|  |  | y |  | 0.330 |  |
|  | B Chromaticity | x |  | 0.137 |  |
|  |  | y |  | 0.102 |  |
|  | Contrast | X |  | 3000 |  |
|  |  | Y |  | 3000 |  |
|  |  | Z |  | 3000 |  |
| Backlight | Type | R |  | FR1112H (LED Manufactured by STANLEY ELECTRIC Co., Ltd.) |  |
|  |  | G |  | DG1112H (LED Manufactured by STANLEY ELECTRIC Co., Ltd.) |  |
|  |  | B |  | DB1112H (LED Manufactured by STANLEY ELECTRIC Co., Ltd.) |  |
|  | Peak Wavelength | R |  | 633 nm |  |
|  |  | G |  | 531 nm |  |
|  |  | B |  | 472 nm |  |
| Polarization plate | Type |  | UHLC2-5618 (Sanritz Corporation) | HLC2-5618 (Sanritz Corporation) | HC2-6018 (Sanritz Corporation) |
|  | Polarization Degree |  | 99.975 | 99.979 | 99.952 |
|  | Screen Size |  |  | 20 inches |  |
| Evaluation Results | Color Purity (NTSC Ratio) |  |  | 100 |  |
|  | Vividness |  | 4.0 | 4.1 | 3.8 |

Tables 5 to 7 show the following. In Comparative Example 1 with low contrast, color purity is good, but vividness is poor. In Comparative Examples 2 to 6 each with a backlight peak wavelength outside the scope of the invention, both color purity and vividness are poor. In Comparative Example 7 whose contrast and peak wavelength are both outside the scope, both color purity and vividness are worst.

In contrast, Examples 1 to 8 all provided good color purity and high vividness, and in particular, best vividness was obtained with respect to a screen size of 20 inches or more. From the results of Examples 9 and 10 and Examples 11 and 12, it is apparent that the higher the contrast, the better the vividness.

As described above, according to the invention, there can be provided liquid crystal displays with improved color purity and improved display color vividness.

The invention claimed is:

1. A liquid crystal display, comprising:
a backlight; a polarization plate; at least two substrates; a liquid crystal layer placed between the substrates; and a color filter layer formed on at least a part of the substrates;
wherein the color filter layer has green pixels that satisfy the relations 0.25<x<0.32 and y>0.58, wherein x and y each represent a chromaticity value in an xy color system using illuminant C,
the color filter layer has a contrast of 1000 or more with respect to each of X, Y and Z values,
the backlight uses a light-emitting device having a peak wavelength in the range of from 520 nm to 540 nm as a light source; and wherein
the backlight comprises a green light-emitting diode (LED) having a peak wavelength in the range of from 520 nm to 540 nm, a blue LED having a peak wavelength in the range of 480 nm or less, and a red LED having a peak wavelength in the range of 610 nm or more, as light sources.

2. The liquid crystal display of claim 1, wherein
the color filter layer has red pixels that satisfy the relations 0.60<x and 0.30<y<0.36, wherein x and y each represent a chromaticity value in the xy color system using illuminant C; and
the color filter layer has blue pixels that satisfy the relations 0.12<x<0.15 and 0.08<y<0.11, wherein x and y each represent a chromaticity value in the xy color system using illuminant C.

3. The liquid crystal display of claim 1, wherein the green pixels satisfy the relations 0.26<x<0.31 and y>0.59, wherein x and y each represent a chromaticity value in the xy color system using illuminant C.

4. The liquid crystal display of claim 1, wherein the green pixels satisfy the relations 0.27<x<0.30 and y>0.595, wherein x and y each represent a chromaticity value in the xy color system using illuminant C.

5. The liquid crystal display of claim 1, wherein the color filter layer has a contrast of 2000 or more with respect to each of the X, Y and Z values.

6. The liquid crystal display of claim 1, wherein the color filter layer has a contrast of least 3000 or more with respect to each of the X, Y and Z values.

7. The liquid crystal display of claim 1, wherein the light-emitting device has a peak wavelength in the range of from 525 nm to 535 nm.

8. The liquid crystal display of claim 1, wherein the polarization plate has a polarization degree of 99.9 or more.

9. The liquid crystal display of claim 1, wherein the polarization plate has a polarization degree of 99.95 or more.

10. The liquid crystal display of claim 1, wherein the polarization plate has a polarization degree of 99.99 or more.

11. The liquid crystal display of claim 1, wherein at least one of the substrates is a transparent substrate.

12. The liquid crystal display of claim 1, wherein at least one of the substrates has a thickness of 200 μm to 1200 μm.

13. The liquid crystal display of claim 1, wherein the color filter layer is formed by using a colored photosensitive resin composition.

14. The liquid crystal display of claim 1, wherein the color filter layer is formed by transferring a photosensitive resin transfer material.

15. The liquid crystal display of claim 1, wherein a screen size thereof is 10 inches or more.

16. The liquid crystal display of claim 1, wherein a screen size thereof is 15 inches or more.

17. The liquid crystal display of claim 1, wherein a screen size thereof is 20 inches or more.

* * * * *